Figure 3:
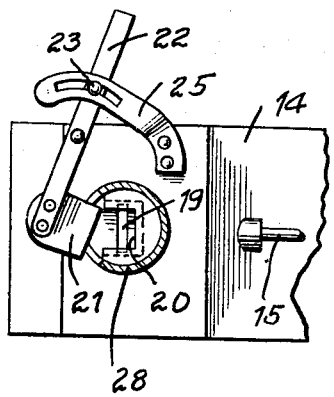

O. F. KERR.
DISCHARGE TUBE FOR FERTILIZER DISTRIBUTERS.
APPLICATION FILED MAY 25, 1914.

1,219,823.

Patented Mar. 20, 1917.

Witnesses
M. S. Watson
Harry M. Test

Inventor
O. F. Kerr

By
Chandler & Chandler
Attorneys

UNITED STATES PATENT OFFICE.

OSCAR F. KERR, OF COMO, TEXAS.

DISCHARGE-TUBE FOR FERTILIZER-DISTRIBUTERS.

1,219,823.     Specification of Letters Patent.     Patented Mar. 20, 1917.

Application filed May 25, 1914. Serial No. 840,862.

*To all whom it may concern:*

Be it known that I, OSCAR F. KERR, a citizen of the United States, residing at Como, in the county of Hopkins, State of Texas, have invented certain new and useful Improvements in Discharge-Tubes for Fertilizer-Distributers; and I do hereby declare the following to be a full, clear, and exact description of the invention, such as will enable others skilled in the art to which it appertains to make and use the same.

This invention relates to improvements in a cut off for chutes for fertilizer distributers, and particularly to devices for distributing fertilizer which can be attached to the ordinary cultivator.

Another object is to provide a device adapted to be connected to a fertilizer attachment for a cultivator which is comparatively simple in construction and which can be driven to feed the fertilizer as the cultivator treats the soil.

Other objects and advantages will be apparent from the following description, when taken in connection with the accompanying drawings.

Figure 2:
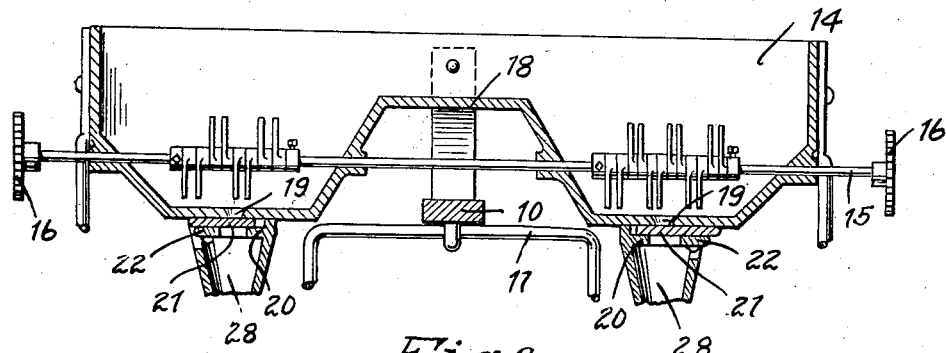
Figure 1:
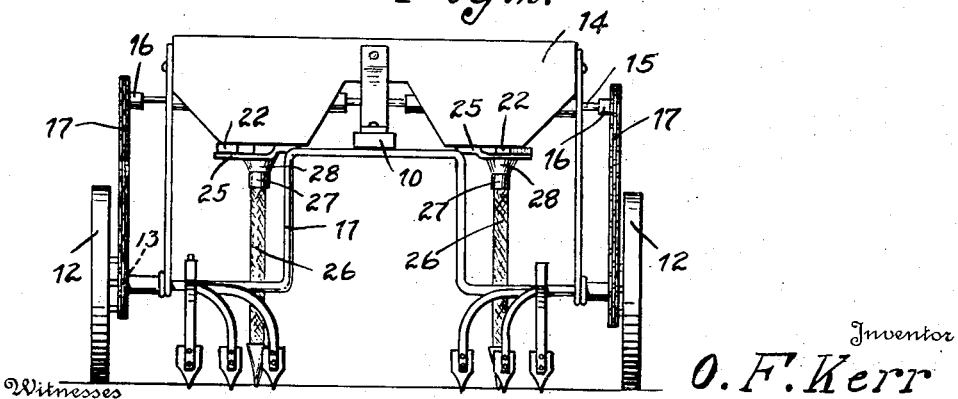

In the drawings:

Figure 1 is a transverse view through a discharge hopper showing my invention applied thereto, Fig. 2 is a rear elevation of a distributer and cultivator, and Fig. 3 is a bottom view of a portion of the hopper with the discharge tube in section.

Referring particularly to the accompanying drawings, 10 represents the tongue of the cultivator and 11 the arched axle thereof, the latter having the ground engaging wheels 12 mounted on the ends. Each of the wheels 12 carries a sprocket wheel 13 suitably clamped to the spokes. Suitably mounted on the tongue is a hopper 14 through which extends the longitudinal shaft 15 carrying on its opposite ends outwardly of the hopper, the sprocket wheels 16 which are driven from the sprockets 13 by means of the chains 17. The center of the hopper is formed with an elevation 18 which divides the hopper into two compartments arranged on opposite sides of the tongue. In the bottom of each of the compartments is an opening 19 and arranged below the opening in suitable guides 20 are the sliding plate valves 21. These plate valves are each connected to a pivoted lever 22 mounted on the bottom of the compartment and having the outer end provided with a bolt 23 and wing nut 24 which pass through the slot of a plate 25 mounted on the bottom of the hopper. By means of this slot and bolt construction, the lever 22 can be swung and clamped in different adjusted positions so as to hold the valve 21 opened or closed to various degrees. Carried on the shaft 15 within each of the compartments are a plurality of agitator blades which rotate with the shaft to stir up the fertilizer and cause the same to flow more freely through the opening. Below the openings are mounted the conveying tubes 26 which receive the fertilizer from the openings of the hopper and deposit the same on the ground. These tubes are preferably formed of rubber and have in their upper ends the threaded sleeves 27 for attachment to the spouts 28. It will be apparent from the foregoing description that the discharge tube of my invention constitutes a unitary device which may be mounted upon any hopper bottom or may be substituted for other discharge tubes on old machines. The transverse web upon which the valve plate is slidably seated permits the device to be butted against the bottom of the hopper, the latter providing the opposite face of the slideway for the valve, in such relation that the device can be made ready for use merely by the work of attachment.

What is claimed is:

The combination with a hopper bottom having an outlet opening formed therethrough, of a discharge tube secured to the lower face of the hopper bottom over said opening, a transverse web formed across the discharge tube below the upper edge thereof and having its central portion cut away to provide a valve opening, the space between the upper face of said transverse web and the upper edge of the tube providing a valve seat, a sliding valve plate slidable into position over said transverse web to occupy said space, the side of the tube opposite said web being slotted to permit the entrance of said valve plate, a pivoted lever for swinging said valve plate into position, and means for securing said valve plate in adjusted position.

In testimony whereof, I affix my signature, in the presence of two witnesses.

OSCAR F. KERR.

Witnesses:
I. B. HOGAN,
J. P. WINTER.